May 22, 1956 W. RÖPKE 2,746,690
MECHANISM FOR DRIVING TAPE-SHAPED SOUND RECORD CARRIERS
Filed Dec. 5, 1951
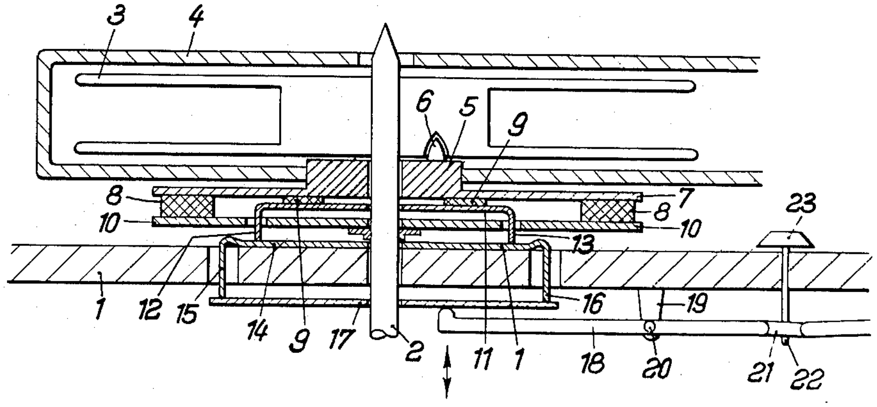
*Inventor:*
Willi Röpke United States Patent Office 2,746,690
Patented May 22, 1956

2,746,690

MECHANISM FOR DRIVING TAPE-SHAPED SOUND RECORD CARRIERS

Willi Röpke, Berlin-Steglitz, Germany

Application December 5, 1951, Serial No. 272,011
4 Claims. (Cl. 242—54)

The devices commonly used for the magnetic recording and reproducing of sounds are mostly designed so that two reels are provided between which the tape- or wire-shaped sound-carrier is alternately wound up and off. In such devices it is necessary for different purposes to accomplish the rewinding or winding-back of the sound-carrier with increased speed, e. g. if sound tapes are employed on which only records in one direction are impressed and which must be wound back after the operation of winding-up the tape on the driving reel has been finished. In such tape-shaped sound record carriers, too, on which two sound tracks are impressed side by side but in opposite directions it is often necessary to provide also a high-speed operation e. g. if certain passages of several speeches or of musical records shall be reproduced.

In the known driving mechanisms for band- or wire-shaped sound record carriers wound on reels the principle is employed to bring the tape reels or special carrier discs, to which the tape-reels are attached, in contact with plane discs with which they can be coupled by friction. In one embodiment of this type, which is preferably employed, the sound tape travels e. g. between the two reels past the magnetic recording, reproducing or erasing heads across a so-called sound pulley which is coupled with the driving motor and which represents the driving mechanism proper controlling the tape speed. In this design the reels themselves are likewise coupled with rotating members of the driving mechanism, however not rigidly but by employing a friction coupling. In this manner the changes of the rotational speed of the reel at the winding-up or winding-off operation caused by the diameter changes of the tape coil are compensated. If this method of driving which is provided for the normal operation of the sound-carrier shall be replaced by the high-speed operation, principally two ways are possible: either, the wind-up reel is rigidly coupled with the driving motor, hereby rotating the wind-off reel while the friction coupling of the wind-off reel, which is provided for normal operation, remains switched-on. In this case, however, the disadvantage takes place that, owing to the excessive pull of the tape at high speeds, the tape can be damaged or even torn. The second method consists in allowing, at high-speed operation, an absolutely free rotation of the wind-off reel, i. e. without any frictional braking, and in connecting the wind-up reel with the driving motor either, as described above, directly and rigidly or by means of the friction coupling provided for normal operation. This method, however, has the disadvantage that the pull of the tape is too small and that, therefore, the tape inclines to looping, particularly if the high speed is being reduced or if the device is being stopped. In this case special braking mechanisms at the wind-off reel would have to be actuated. This, too, would be disadvantageous for practical operation.

The disadvantages described above are removed by the present invention. The object of this invention is a mechanism for driving sound record tapes wound on reels including means for high-speed operation, said mechanism comprising a tape reel carrier provided with a coupling disc carried by a plate, friction layers being arranged between said coupling disc and said plate, a second disc arranged between said coupling disc and said plate, friction layers being arranged between said coupling disc and said second disc, holes being provided in said plate, lugs being provided on said second disc, said lugs being bent downwards perpendicularly to the face of said plate, projecting through said holes of said plate and mounted on an intermediate disc adapted to be moved upwards, thereby disengaging the friction coupling between the plate and the coupling disc, said tape reel, said tape reel carrier, said coupling disc, said plate, said second disc and said intermediate disc being arranged coaxially around a shaft.

The drawing shows by way of example an embodiment of the invention representing only those parts which are necessary for understanding the invention. The drawing shows one half of a mechanism for driving sound tapes with one of the two reels which are employed. This device consists of the following principal members: A shaft 2, to which the tape reel 3 is centrically keyed, projects from an opening of a base plate 1. Said reel 3 is usually housed in an oval container 4 of which only one half is shown in the drawing; the other half, which is not shown in the drawing, is designed in the same manner and is likewise provided with a carrying and driving device for the second sound tape reel. The tape reel 3 is carried by a special carrier 5 which is designed as a short cylinder likewise centered by the shaft 2; the carrier 5 is provided with a pin 6 which, after the reel 3 has been keyed, projects into a corresponding recess or hole in the body of reel 3, thus effecting a rigid connection between reel 3 and carrier 5. The lower part of the carrier 5 is designed as a coupling disc 7. This disc is fitted with two friction layers as rings 8 and 9 consisting of a frictional material, e. g. felt, rubber, or the like. These friction rings are in contact with a plate 10 connected with the shaft 2 which is coupled with a driving motor (not shown) by a free-wheel gear as shown e. g. in Fig. 3 of U. S. A. Patent No. 531,577.

The following special members of the device are the object of this invention. The plate 10 is coupled with the carrier disc 7 not only, as at the devices commonly employed hitherto, by one brake lining 8 but there is provided a concentric smaller inner disc 11 which is connected by friction coupling with the inner ring-shaped friction surface of disc 7. The inner disc 11 is fitted at its edge with several, e. g. three or four, lugs projecting downwards through corresponding openings of plate 10. In the drawing the lugs 12 and 13 are shown. These lugs are in contact with an intermediate disc 14 which, on its part, is supported by the base plate 1 and is likewise fitted with lugs 15 and 16 projecting downwards through corresponding openings of the base plate 1. These lugs 15 and 16, which can be similarly arranged and in the same number as the lugs 12 and 13 of the inner disc 11, are supported by a plane plate 17 which is rigidly or loosely connected with a lever 18 turning on an axle 20 mounted in a carrier 19. The free arm of the lever 18 is designed as to be moved upwards or downwards; if it is pressed downwards about 1 mm. or more, the plate 17 and, together with it, the intermediate disc 14 and the inner disc 11 supported by it are lifted till the disc 7 of the reel carrier 5 is supported only by its inner friction ring 9, the greater friction ring 8 being removed from disc 10 so that this part of the friction device is no more in operation. The free arm of the lever 18 preferably ends in a guide 21 consisting of one or two spirally arranged control surfaces which are connected by a shaft 22; this shaft 22 passes through a corresponding hole in the base plate 1 and can be controlled e. g. by a rotary knob 23.

The operation of this device is as follows: If the reel 3 shall be employed, as a wind-up reel for normal-speed operation, the corresponding members of the device are electrically and mechanically switched so that shaft 2, which is directly driven by the motor, moves the frictional plate 10. The second reel (not shown in the drawing) of the container which in this case operates as wind-off reel is likewise in full friction coupling with its supporting plate 10 which in this case remains stationary. The travel speed of the sound carrier is controlled, in a manner known per se, by the sound pulley (not shown in the drawing) which is coupled with the driving motor and which drives the sound carrier tape on its surface by friction. If the direction of travel of the sound tape is reversed, no fundamental change of the conditions described above does occur; only the function of one reel is exchanged with that of the other reel of the container.

As soon as the high-speed operation is switched on for rewinding or the like, the members proposed by this invention come into action, supposing the reel 3 is the wound-off reel: The driving motor is switched to high speed by means of the switching knob 23. The spirally inclined guiding surface 21 provided at the shaft 22 of this knob 23 presses the opposite end of the lever 18 a little upwards, thus lifting the plate 17 and, together with it, the intermediate disc 14 as well as the inner coupling disc 11. Consequently, the lower part 7 of the reel carrier 5 is in friction coupling with the stationary disc 11 only by means of the friction ring 9 whereas the coupling contact with the friction plate 10 and the outer friction ring 8 is disengaged. This position is provided at that reel which, at the high-speed operation, is rotated only by the tape pull, i. e. for the wind-off reel, whereas the wind-up reel, i. e. the reel effecting the tape drive and its carrier 5 remains, by means of the friction rings 8 and 9, in full friction coupling contact with plate 10 driven by the shaft 2. The sound pulley which at normal speed operation controlled the travel speed of the tape is disconnected at high-speed operation either by lifting the tape from the pulley surface or by switching-on a free-wheel device of this pulley. Owing to the device corresponding to this invention, the reel rotated by the tape slides, at high-speed operation, on its stationary support with a smaller frictional resistance than at normal speed.

The lever guide 21 at the shaft 22 of the change-over switch 23 is designed so that also the lever end for the other reel (not shown in the drawing) of the container engages in it; hereby, according to the position of the switch 23 either or the other lever 18 is lifted according as which reel serves as wind-off reel for the high-speed operation.

Certain changes of the construction shown in the drawing are possible: Thus, the coupling lever between the switch 23 and the discs 17 and 14 can be replaced by other types of coupling, e. g. by a coupling warranting an exact parallel motion of the members lifting the inner disc 11. For this purpose, e. g. a sleeve can be provided on shaft 2, the upper end of which is connected with the inner friction disc 11 or supports the latter whereas the lower face of the sleeve is connected or in contact with the lever 18 or a corresponding coupling member.

Furthermore, the pin 6 on the reel carrier 5 can be replaced by other means, known per se, which accomplish a rigid connection between the reel 3 and its carrier 5.

The raising and lowering of the inner disc 11 can be accomplished, too, electrically instead of mechanically, e. g. by means of an electromagnet actuated by the switch for high-speed operation.

Finally, the friction surfaces 8 and 9 need not be integral rings but can be combined of single pieces of felt, rubber, or the like the size of which is chosen according to the prevailing conditions.

I claim:

1. A mechanism for driving sound record tapes wound on reels including means for high-speed operation, said mechanism comprising a tape reel carrier provided with a coupling disc carried by a plate, friction layers being arranged between said coupling disc and said plate, a second disc arranged between said coupling disc and said plate, friction layers being arranged between said coupling disc and said second disc, holes being provided in said plate, lugs being provided on said second disc, said lugs being bent downwards perpendicularly to the face of said plate, projecting through said holes of said plate and mounted on an intermediate disc adapted to be moved upwards, thereby disengaging the friction coupling between the plate and the coupling disc, said tape reel, said tape reel carrier, said coupling disc, said plate, said second disc and said intermediate disc being arranged co-axially around a shaft, said plate being fixed on said shaft.

2. A mechanism for driving sound record tapes wound on reels including means for high-speed operation, said mechanism comprising a tape reel carrier provided with a coupling disc carried by a plate, friction layers being arranged between said coupling disc and said plate, a second disc arranged between said coupling disc and said plate, friction layers being arranged between said coupling disc and said second disc, holes being provided in said plate, lugs being provided on said second disc, said lugs being bent downwards perpendicularly to the face of said plate, projecting through said holes of said plate and mounted on an intermediate disc adapted to be moved upwards, thereby disengaging the friction coupling between the plate and the coupling disc, said tape reel, said tape reel carrier, said coupling disc, said plate, said second disc and said intermediate disc being arranged co-axially around a shaft, said plate being fixed on said shaft, the friction layer between said coupling disc and said second disc being of smaller amount than the friction layer between said coupling disc and said plate.

3. A mechanism for driving sound record tapes wound on reels including means for high-speed operation, said mechanism comprising a tape reel carrier provided with a coupling disc carried by a plate, friction layers being arranged between said coupling disc and said plate, a second disc arranged between said coupling disc and said plate, friction layers being arranged between said coupling disc and said second disc, holes being provided in said plate, lugs being provided on said second disc, said lugs being bent downwards perpendicularly to the face of said plate, projecting through said holes of said plate and mounted on an intermediate disc adapted to be moved upwards, thereby disengaging the friction coupling between the plate and the coupling disc, said intermediate disc being supported, by means of lugs projecting through corresponding holes of a base plate, by a plane plate connected with a lever moved by a knob, said tape reel, said tape reel carrier, said coupling disc, said plate, said second disc and said intermediate disc being arranged co-axially around a shaft.

4. A mechanism for driving sound record tapes wound on reels including means for high-speed operation, said mechanism comprising a tape reel carrier provided with a coupling disc carried by a plate, friction layers being arranged between said coupling disc and said plate, a second disc arranged between said coupling disc and said plate, friction layers being arranged between said coupling disc and said second disc, holes being provided in said plate, lugs being provided on said second disc, said lugs being bent downwards perpendicularly to the face of said plate, projecting through said holes of said plate and mounted on an intermediate disc adapted to be moved upwards, thereby disengaging the friction coupling between the plate and the coupling disc, said intermediate disc being supported, by means of lugs projecting through corresponding holes of a base plate, by a plane plate connected with a lever moved by a knob, the shaft of said knob being provided with a spirally inclined guiding surface for actuating one arm of said lever, said tape reel, said tape reel carrier, said coupling disc, said plate, said second disc and said intermediate disc being arranged co-axially around a shaft.

References Cited in the file of this patent

UNITED STATES PATENTS

| | | |
|---|---|---|
| 1,142,384 | Tiffany | June 8, 1915 |
| 1,155,776 | Washburn | Oct. 5, 1915 |
| 2,089,287 | Molloy | Aug. 16, 1937 |
| 2,091,756 | Fodor | Aug. 31, 1937 |